UNITED STATES PATENT OFFICE.

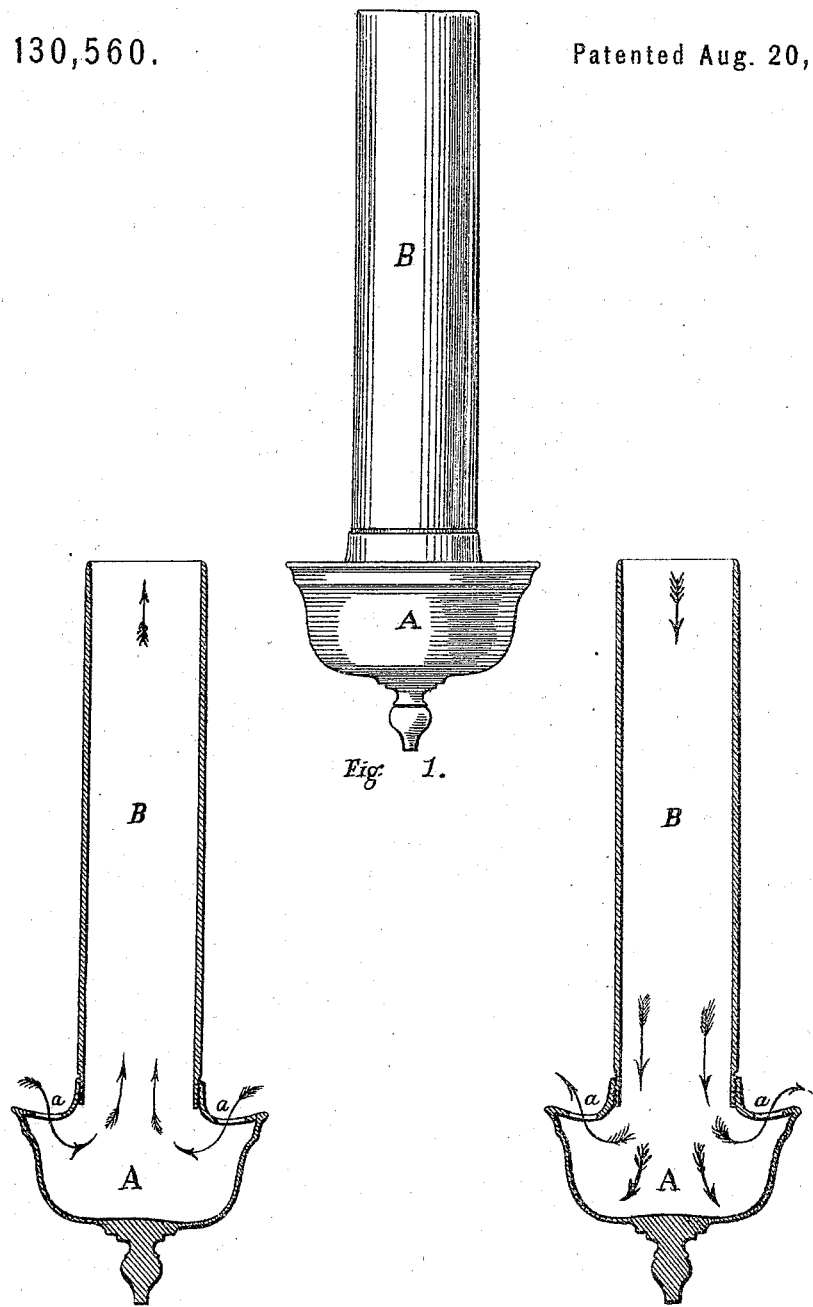

WILLIAM S. BLUNT, OF BROOKLYN, NEW YORK.

IMPROVEMENT IN STRAINERS FOR PUMPS.

Specification forming part of Letters Patent No. 130,560, dated August 20, 1872.

*To all whom it may concern:*

Be it known that I, WILLIAM S. BLUNT, of Brooklyn, Kings county, New York, have invented, made, and applied to use a new and useful Strainer for Pumps; and that the following is a full, clear, and correct description of my invention, reference being had to the accompanying drawing making part of this specification and to the letters of reference marked thereon, in which—

Figure 1 is a side elevation of my improved strainer when applied to the induction-pipe of a pump. Fig. 2 is a vertical cut section of the same, showing the manner in which the water enters the induction-pipe through the strainer. Fig. 3 is a vertical cut section of the induction-pipe and strainer, showing how the water leaves the induction-pipe through the strainer.

In the drawing like parts of the invention are pointed out by the same letters of reference.

The nature of the present invention consists in the construction, as more fully hereinafter set forth, of an improved strainer to be combined with the induction-pipe of a pump; the object of the invention being, by combining said strainer with the induction-pipe of a pump, to allow the water to be drawn from wells without disturbing the sediment at the bottom, and thus preventing the entrance of foreign matter into the pump with the water and guarding against the roiling of the water.

To enable those skilled in the arts to make and use my invention, I will describe the construction and operation of the same.

A shows my improved strainer, made of any suitable metal. The strainer is made hemispherical in shape, and its upper surface is provided with a series of openings, *a*. A neck is formed upon the upper surface and has cut upon its interior a screw-thread, into which one end of an induction-pipe, B, having a screw-thread cut upon its exterior, may be screwed. B shows the induction or suction pipe of the pump, through which the water is supplied to the pump. The strainer A is attached to the bottom end of the induction-pipe B.

Such being the construction, the operation is as follows: The strainer having been attached to the bottom of the induction-pipe, and the same having been placed in position in the well, the strainer resting on the bottom of the well, when the pump is operated the water, which has previously entered the strainer by its own gravity, will be elevated in the induction-pipe, and, as the same is supplied to the pump, a further supply of water will enter the strainer and be supplied to the induction-pipe. The strainer A being placed near the bottom of the well, and the water entering the same by its own gravity, no sediment will be drawn from the same even in the most shallow wells, the water entering as clearly shown in Fig. 2 of the drawing, and as the water returns from the suction-pipe into the strainer (see Fig. 3 of the drawing) it tends to clear out the bottom of the strainer, and rising upward and outward the water is distributed equally, and does not disturb the bottom.

My improvement will be found particularly advantageous in cases where shallow wells are constructed.

Having now set forth my invention, what I claim as new is—

The combination, with the induction-pipe B, of the strainer A, constructed as shown, having its perforations *a* situated in the same horizontal plane, and arranged as described, so that the water shall descend in entering them for the purpose of preventing disturbance of the bottom of the well, as specified.

WILLIAM S. BLUNT.

In presence of—
 WM. HASTINGS,
 A. SIDNEY DOANE.